United States Patent
Strauss et al.

(10) Patent No.: US 6,983,830 B2
(45) Date of Patent: Jan. 10, 2006

(54) DISC BRAKE

(75) Inventors: Wilfried Strauss, Wald-Michelbach (DE); Robert Allen Emmett, Rennerod (DE); Peter Gareth Denton, Wipperfuerth (DE); Michael Edmund Rohde, Polch (DE)

(73) Assignee: Federal-Mogul Friction Products GmbH, Bad Camberg (DE)

( * ) Notice: Subject to any disclaimer, the term of this patent is extended or adjusted under 35 U.S.C. 154(b) by 0 days.

(21) Appl. No.: 10/333,233

(22) PCT Filed: Jul. 30, 2001

(86) PCT No.: PCT/GB01/03396

§ 371 (c)(1),
(2), (4) Date: Sep. 22, 2003

(87) PCT Pub. No.: WO02/10608

PCT Pub. Date: Feb. 7, 2002

(65) Prior Publication Data

US 2004/0211630 A1    Oct. 28, 2004

(30) Foreign Application Priority Data

Jul. 31, 2000    (EP)    ................................. 00306517

(51) Int. Cl.
F16D 55/226 (2006.01)

(52) U.S. Cl. ................................. 188/73.32; 188/250 G

(58) Field of Classification Search ............... 188/73.1, 188/73.73, 73.32, 250 R, 250 G, 250 B
See application file for complete search history.

(56) References Cited

U.S. PATENT DOCUMENTS

| | | | | |
|---|---|---|---|---|
| 45,975 A | * | 1/1865 | Champlin | 188/234 |
| 3,424,282 A | * | 1/1969 | Meier | 188/345 |
| 3,473,631 A | * | 10/1969 | Schmid | 188/71.1 |
| 4,050,619 A | | 9/1977 | Tarr | |
| 4,428,461 A | * | 1/1984 | Warwick | 188/72.4 |
| 4,433,757 A | | 2/1984 | Warwick et al. | |
| 5,117,949 A | * | 6/1992 | Buckley et al. | 188/73.31 |
| 6,279,222 B1 | * | 8/2001 | Bunker et al. | 29/527.5 |

FOREIGN PATENT DOCUMENTS

| | | |
|---|---|---|
| DE | 2365508 | 6/1975 |
| DE | 4301006 A1 * | 7/1994 |
| EP | 0336465 | 11/1989 |
| EP | 508423 A1 * | 10/1992 |
| GB | 2259553 | 3/1993 |
| JP | 60175832 A * | 9/1985 |
| JP | 61074924 | 4/1986 |

* cited by examiner

Primary Examiner—Xuan Lan Nguyen
(74) Attorney, Agent, or Firm—Polster, Lieder, Woodruff & Lucchesi L.C.

(57) ABSTRACT

A disc brake including pads which are supported in sockets having an opening facing towards the disc. The pads each comprise blocks of friction material which are plugged into the sockets.

12 Claims, 3 Drawing Sheets

DISC BRAKE

CROSS-REFERENCE TO RELATED APPLICATIONS

The present application is related to, and claims priority from, International Application No. PCT/GB01/03396, filed on Jul. 30, 2001, and European Application No. 00306517.4, filed on Jul. 31, 2000.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

This invention is concerned with a disc brake comprising a disc mounted for rotation with a hub, friction material pads mounted on opposite sides of said disc, and operating means operable to cause the pads to engage opposite sides of the disc to cause braking of the disc and hence of the hub.

In a conventional disc brake of the spot type, the pads each comprise a block of friction material mounted on a backing plate. The backing plates are mounted, either fixedly or for movement towards the disc. Whether the mounting is fixed or for movement depends on the position of the operating means relative to the assembly and on the type of brake. Where the brake is of the sliding-caliper type and the operating means, eg a hydraulically-operated piston and cylinder assembly, is on one side of the disc, the block and backing plate on the operating means side of the disc is moveably mounted while the other block and backing plate can be fixedly-mounted on the caliper. When the friction material becomes worn, the block and backing plate are replaced, with the backing plate generally being thrown away.

Conventional pad assemblies for disc brakes are manufactured by positioning a backing plate across an opening of a die cavity containing curable particulate material, compressing the particulate material against the backing plate to form a block adhered to the backing plate, and curing the material. However, this is a complex operation and it is difficult to ensure that the block adheres sufficiently to the backing plate to withstand the very high shearing forces encountered during braking. Indeed, special measures are often taken to improve adhesion, eg projections or recesses of the backing plate may be provided to key the plate and the block together. (See for example GB 2259553 A and DE 2365508 A.)

BRIEF SUMMARY OF THE INVENTION

It is an object of the present invention to provide a disc brake which has pads which can be more simply manufactured than those of a conventional disc brake.

The invention provides a disc brake comprising a disc mounted for rotation with a hub, friction material pads arranged to engage the disc to cause braking of the disc and hence of the hub, and operating means operable to cause the pads to engage the disc, the disc brake also comprising supporting structure by which the pads are supported, the supporting structure comprising a first slidably mounted member which extends past an edge of the disc and supports at least one pad on one side of said disc, and a second slidably mounted member which supports at least one pad on the other side of the disc, characterised in that at least one of the friction material pads is in the form of a block of friction material which is supported in a socket formed in the first slidably mounted member, the socket having an opening facing towards the disc, the pad being plugged into the socket In a disc brake according to the invention, the pads have no backing plates, greatly simplifying manufacture and replacement costs. Since there is no backing plate, the reaction forces are taken by the side wall of the socket. The pad is plugged into the socket as an integral pad rather than being introduced as particulate material. Clearly, the pad has to be dimensioned so that once plugged into a socket, it is a relatively tight fit in the socket and projects from the socket towards the disc. However, it is not necessary for the pad to be secured in the socket by adhesive or other means since the pad cannot "escape" from the socket due to the proximity of the disc.

Preferably, at least one of the friction material pads on the other side of the disc is in the form of a block of friction material which is supported in a socket formed in the second slidably mounted member, the socket having an opening facing towards the disc, the pad being plugged into the socket. The second slidably mounted member may be in the form of a pressure distribution plate positioned between the disc and the operating means, the pressure distribution plate serving to distribute the pressure applied by the operating means more evenly over the block or blocks.

Preferably, at least one of the sockets is formed by cylindrical recess.

In order to reduce machining, preferably, the socket is formed in a cast member, eg the socket can be cast into an iron or other metal member.

In order to ensure a good fit of the block in the socket and to ensure easy removal of the block from the socket, it is preferred that the block comprises a ring which encircles, or a cup which encloses, the portion of the block which enters the socket. The ring or cup is pre-formed, eg from steel or cast iron, and particulate curable material is compressed and cured therein. Since the material within the socket does not require good friction properties, the friction material of the block may have a laminated structure with the material within the socket having a different composition to that which projects from the socket.

DETAILED DESCRIPTION OF THE INVENTION

Figure 1:
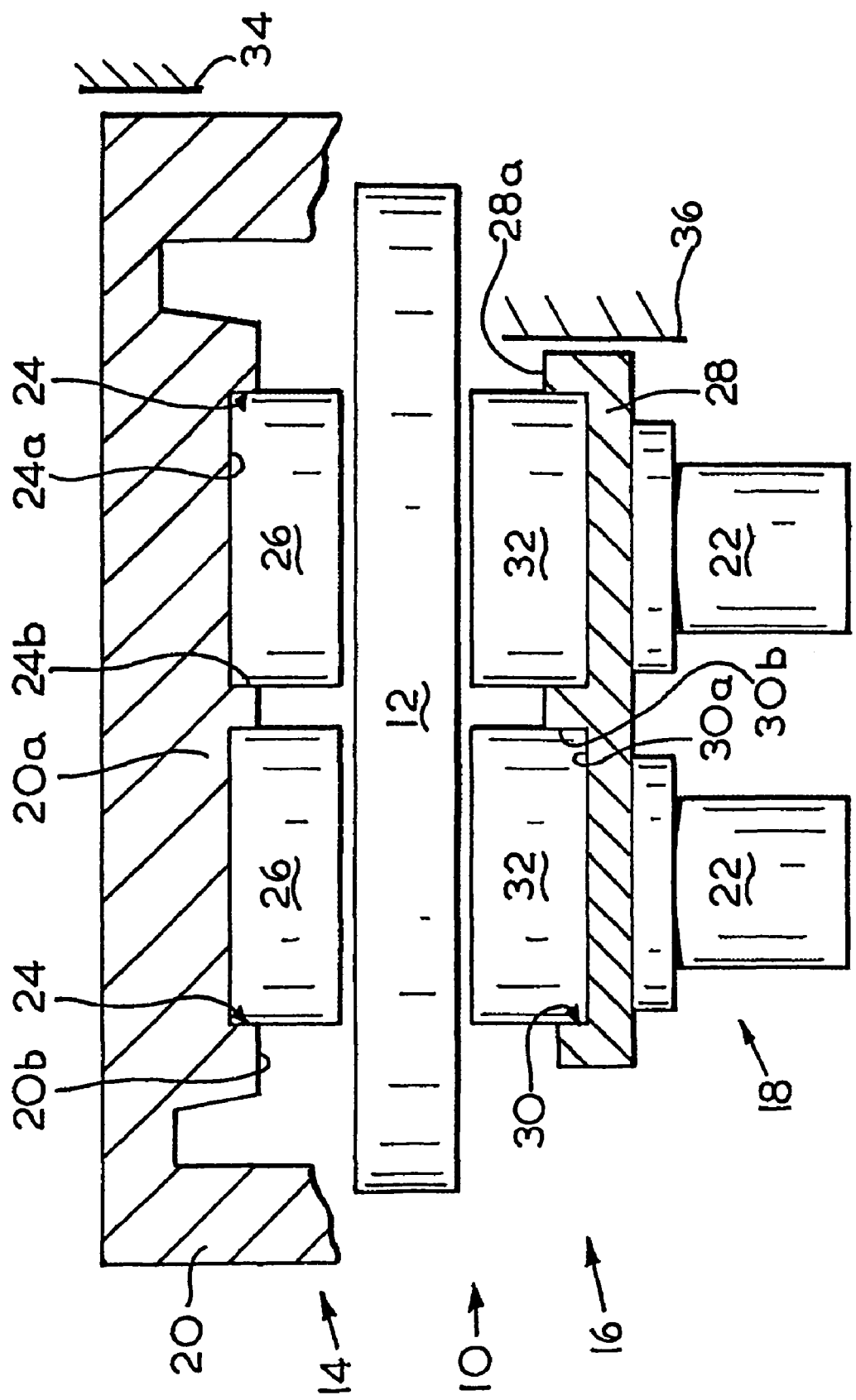
FIG. 1 is a diagrammatic plan view of the illustrative disc brake.

The illustrative disc brake 10 comprises a disc 12 which is mounted for rotation with a hub (not shown). Specifically, the disc 12 is fixedly mounted on the hub of a wheel of a motor vehicle and the disc brake 10 is operable to apply braking forces to the disc 12 which are transmitted to the hub and hence to the wheel to brake the vehicle.

The disc brake 10 comprises friction material pads 26 and 32 which are arranged to engage the disc 12 to cause braking of the disc and hence of the hub. Specifically, a first friction pad arrangement 14 is located so that pads 26 thereof can engage one side of the disc and a second friction pad arrangement 16 is located so that pads 32 thereof can engage the other side of the disc. The disc brake 10 also comprises operating means 18 operable to cause the pads 26 and 32 to engage the disc. The pad assemblies 14 and 16 also comprise supporting structure by which the pads 26 and 32 are supported. This supporting structure comprises a first slideably mounted member 20 in the form of a caliper. The caliper 20 is mounted, in conventional manner, on a slideway (not shown) on one side of the disc 12 to slide in a direction parallel to the axis of the disc. The caliper 20 extends past an outer circumferential edge of the disc 12 to the other side of the disc where the pads 26 are mounted thereon.

The operating means 18 comprises a pair of pistons 22 mounted in cylinders (not shown) for movement towards the disc 12 when air under pressure is introduced into the cylinders. The cylinders are mounted on the same side of the disc as the slideway on which the caliper 20 is mounted. The cylinders are formed in a fixed (relative to the position of the disc 12) housing (not shown) and open towards the disc. Instead of air under pressure, the operating means 18 may be operated by hydraulic fluid under pressure or any other suitable force applicator may be used.

The caliper 20 has two sockets 24 formed therein. Each of these sockets 24 has an opening facing towards said disc 12. Specifically, the sockets 24 are formed in an integral projection 20a of the caliper 20 which extends radially inwardly of the disc 12 and provides a substantially flat surface 20b which faces and extends parallel to one of the side surfaces of the disc 12. The pads 26 each comprise a block of friction material which is supported in one of the sockets 24, the block being plugged into said socket 24. In this case, the block 26 is in the form of a cylinder while the socket 24 is in the form of a cylinder of shorter length than the block 26 and of slightly greater diameter. The diameters of the socket 24 and of the block 26 are selected so that the block 26 can be readily inserted into the socket 24 but is a tight fit therein. Once in the socket 24, the block 26 engages the bottom surface 24a and the side surface 24b of the socket 24. The block 26 projects beyond the surface 20b towards the disc 12 and, in service, cannot escape from the socket 24 because of the small clearance (even in the brakes-off condition) between the surface 20a and the disc 12. For this reason, it is not necessary for the block 26 to be further secured in the socket 24 and, for example when it becomes worn, it can be removed from the socket 24 and replaced. One of the sockets 24 and the block 26 supported therein have their longitudinal axes aligned with that of one of the pistons 22. The other socket 24 and the block 26 supported therein have their longitudinal axes aligned with that of the other of said pistons 22.

The supporting structure also comprises a pressure plate 28 which is mounted on the opposite side of the disc 12 to the projection 20a of the caliper 20 and extends parallel to the side surfaces of the disc 12. The pressure plate 28 is mounted on a slideway (not shown) for movement towards or away from the disc 12, the movement being parallel to the axis of the disc. The pistons 22 engage the pressure plate 28, on its opposite side to the disc 12, to press it towards the disc 12. The pressure plate 28 is formed from cast iron (steel and other materials may be used instead of cast iron). The pressure plate 28 has a substantially flat surface 28a which faces the disc 12. Two sockets 30 are formed in the pressure plate 28, each socket 30 having an opening in the surface 28a facing towards said disc 12. Each of the pads 32 is in the form of a block of friction material which is similar to those forming the pads 26. Each pad 32 is supported in one of the sockets 30, the pad 32 being plugged into said socket 30. As with the socket 24 and the block 26, each block 32 is in the form of a cylinder while the socket 30 is in the form of a cylinder of shorter length than the block 32 and of slightly greater diameter. The diameters of the socket 30 and of the block 32 are selected so that the block 32 can be readily inserted into the socket 30 but is a tight fit therein. Once in the socket 30, engages a bottom surface 30a and a side surface 30b of the socket 30. The block 32 projects beyond the surface 28a towards the disc 12 and, in service, cannot escape from the socket 30 because of the small clearance (even in the brakes-off condition) between the surface 28a and the disc 12. For this reason, it is not necessary for the block 32 to be further secured in the socket 30 and, for example when it becomes worn, it can be renewed from the socket 30 and replaced. The sockets 30 and the blocks 32 each have their longitudinal axes aligned with that of one of the pistons 22 and with those of one of the sockets 24 and the blocks 26.

Figure 2:
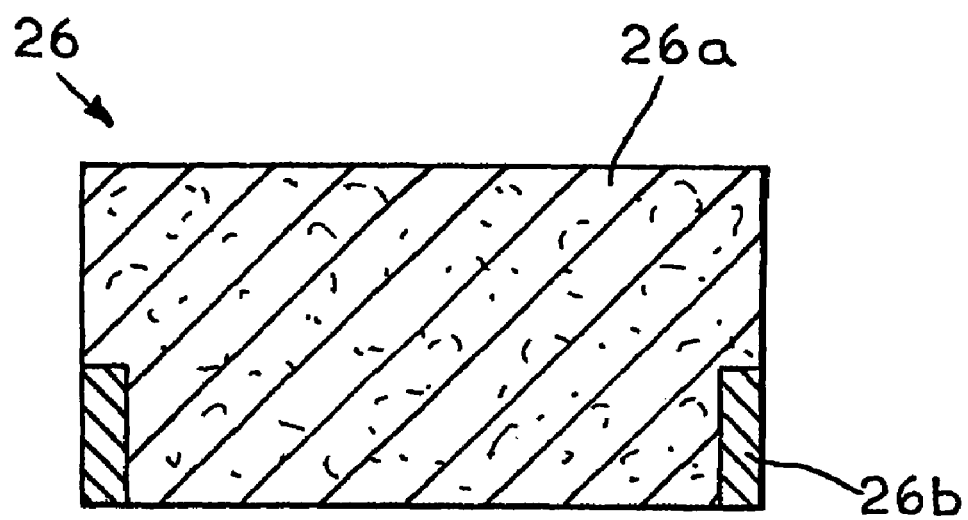
FIG. 2 is a cross-sectional view taken through a pad of the illustrative disc brake.
Figure 3:
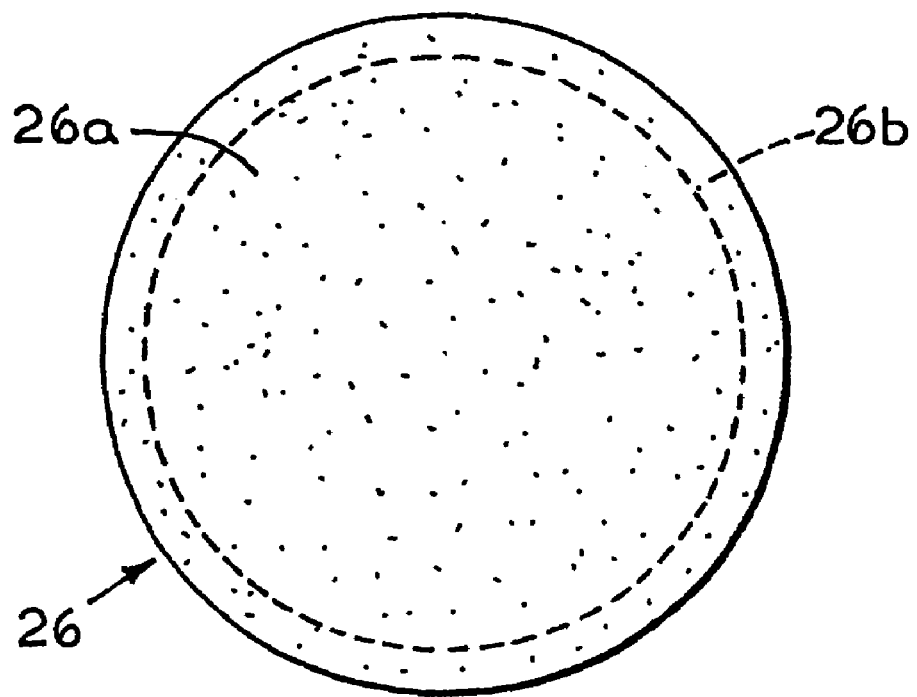
FIG. 3 is a plan view of the pad shown in FIG. 2.

As can be seen in FIGS. 2 and 3, the blocks 26 may comprise friction material 26a and a steel ring 26b (cast iron is an alternative). The ring 26b encircles an end portion of the block 26. The ring 26a is cylindrical and has a length which is equal to the depth of the socket 24 so that the side surface 24a of the socket 24 engages only the ring 26b. The block 32 may be provided with similar rings to the ring 26b.

In the operation of the disc brake 10, the pistons 22 press the plate 28 so that it slides bringing the blocks 32 into engagement with the disc 12. The caliper 20 then slides, in the opposite direction, bringing the blocks 26 into engagement with the other side of the disc 12. The forces applied by the disc 12 to the friction material 26b of the blocks 26 is transmitted by the rings 26b to the caliper 20 which reacts, in conventional manner, against an abutment 34 of the vehicle. The forces applied by the disc 12 to the friction material of the blocks 32 is transmitted by their rings to the plate 28 which reacts against an abutment 36 of the vehicle.

Figure 4:
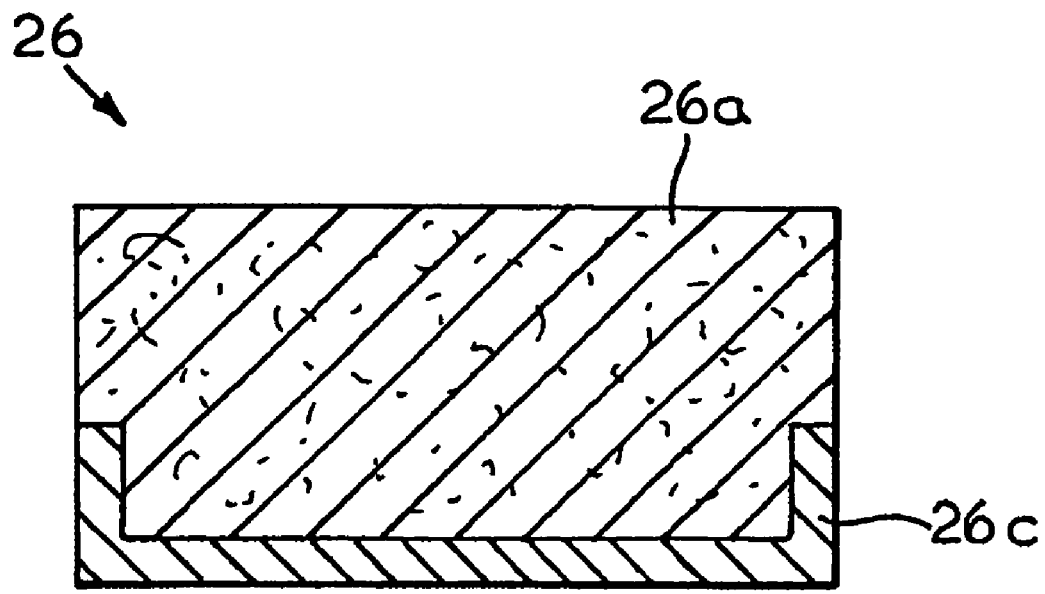
FIGS. 4 and 5 are similar views to FIG. 2 but of alternative pads for use in the illustrative disc brake.

FIG. 4 shows an alternative form of the block 26 in which the ring 26b is replaced by a cup 26c which is similar to the ring 26b except that the bottom of the cup 26c covers the end surface of the friction material 26a, preventing it from sticking to the bottom 24b of the socket 24. The cup 26c may be made from steel or cast iron or other suitable material and all the blocks of a brake may comprise such a cup.

Figure 5:
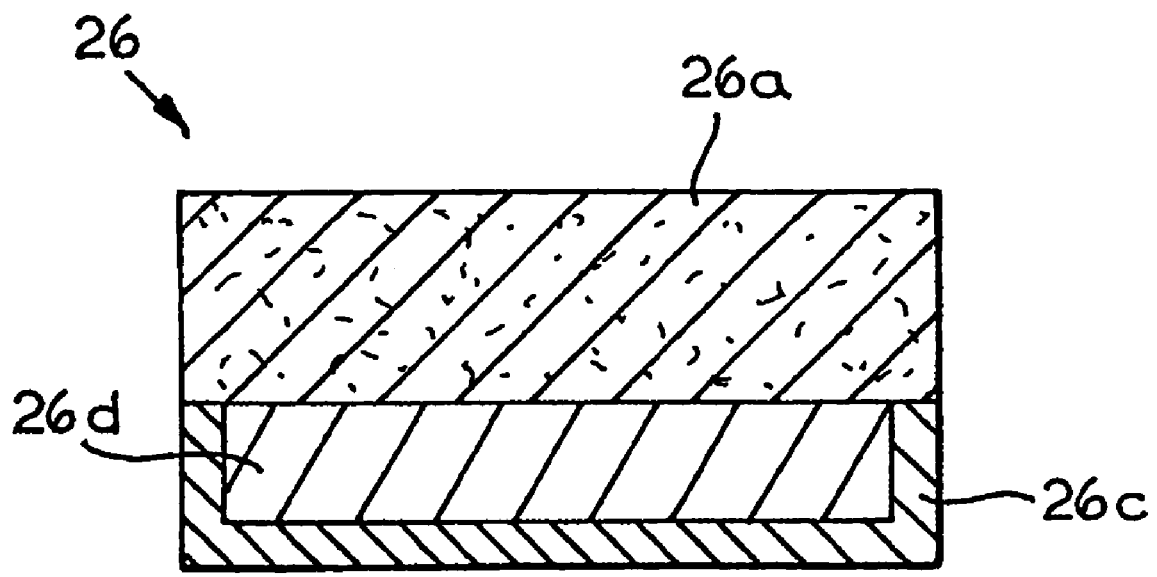

FIG. 5 shows a further alternative form of block 26 in which the friction material has a laminated form, having a layer 26d which is within the cup 26c which is formed of a different material to the friction material 26a.

Although the blocks 26 and 32 are of circular transverse cross-section and in pairs, there may be any number of blocks having any transverse cross-section.

What is claimed is:

1. A disc brake comprising:
   a disc mounted for rotation with a hub;
   a plurality of friction material pads arranged to engage the disc to cause braking of the disc and hence of said hub;
   an operating means operable to cause said plurality of friction material pads to engage said disc;

a supporting structure by which said plurality of friction material pads are supported, said supporting structure including a first slidably mounted member which extends past an edge of said disc and supports at least one friction material pad on one side of said disc, and a second slidably mounted member which supports at least one friction material pad on the other side of said disc, said first slidably mounted member slidable relative to said second slidably mounted member wherein at least one of said friction material pads is in the form of a block of friction material which is supported in against movement within a socket formed in said first slidably mounted member, said socket having an opening facing towards said disc, said friction material pad being plugged into said socket;

and wherein said friction material pad includes a solid ring having a continuous outer surface which encircles a portion of said block of friction material which enters said socket.

2. A disc brake of claim 1 wherein said ring forms a sidewall of a cup which encloses only said portion of said block of friction material which enters said socket; and wherein a portion of said block of friction material extends beyond said sidewall.

3. A disc brake of claim 1 wherein said ring is formed from cast iron.

4. A disc brake of claim 1 wherein said friction material of said block has a laminated structure, with the friction material within said socket having a first composition, and said friction material which projects from said socket having a second composition; and wherein said solid ring encircles only said friction material having said first composition.

5. A disc brake of claim 1 wherein at least one of said friction material pads is in the form of a block of friction material which is supported against movement within a second socket formed in said second slidably mounted member, said second socket having an opening facing towards said disc, and wherein said friction material pad is plugged into said socket.

6. A disc brake according to claim 5, wherein said second slidably mounted member is in the form of a pressure distribution plate positioned between said disc and said operating means.

7. A disc brake of claim 1 wherein at least one of said sockets is formed by a cylindrical recess having a circular cross section.

8. A disc brake of claim 1 further including at least one additional socket which is formed in at least one of said slidably mounted members and at least one additional friction material pad which is plugged into said at least one additional socket.

9. A disc brake of claim 2 wherein said cup is formed from cast iron.

10. A disc brake of claim 1 wherein said first slideably mounted member and said second slidably mounted member are slidable in directions to and from opposite sides of said disc.

11. A disc brake of claim 1 wherein said block of friction material which is supported in said socket formed in said first slidably mounted member is supported against movement within said socket by a side surface of said socket and a bottom surface area of said socket.

12. A disc brake comprising:

a disc mounted for rotation with a hub;

a plurality of friction material pads arranged to engage the disc to cause braking of the disc and hence of said hub;

an operating means operable to cause said plurality of friction material pads to engage said disc;

a supporting structure including a first slidably mounted member which extends past an edge of said disc and supports at least one friction material pad on one side of said disc, and a second slidably mounted member which supports at least one friction material pad on an opposite side of said disc, said first slidably mounted member slidable relative to said second slidably mounted member;

wherein at least one of said friction material pads is in the form of a block of friction material which is supported against movement within a socket formed in said first slidably mounted member, said socket having an opening facing towards said disc, said friction material pad being plugged into said socket;

and wherein said friction material pad includes a solid ring having a continuous outer surface which encircles only a portion of said block of friction material which enters said socket, said outer surface of said ring seating against an inner surface of said socket.

* * * * *